Aug. 4, 1953  A. E. BISHOP  2,647,890
PROCESS FOR THE EXTRACTION OF PECTIN
FROM SUGAR BEET WATERS
Filed Jan. 20, 1950  3 Sheets-Sheet 1

INVENTOR
ALFRED E. BISHOP
by
ATTORNEYS

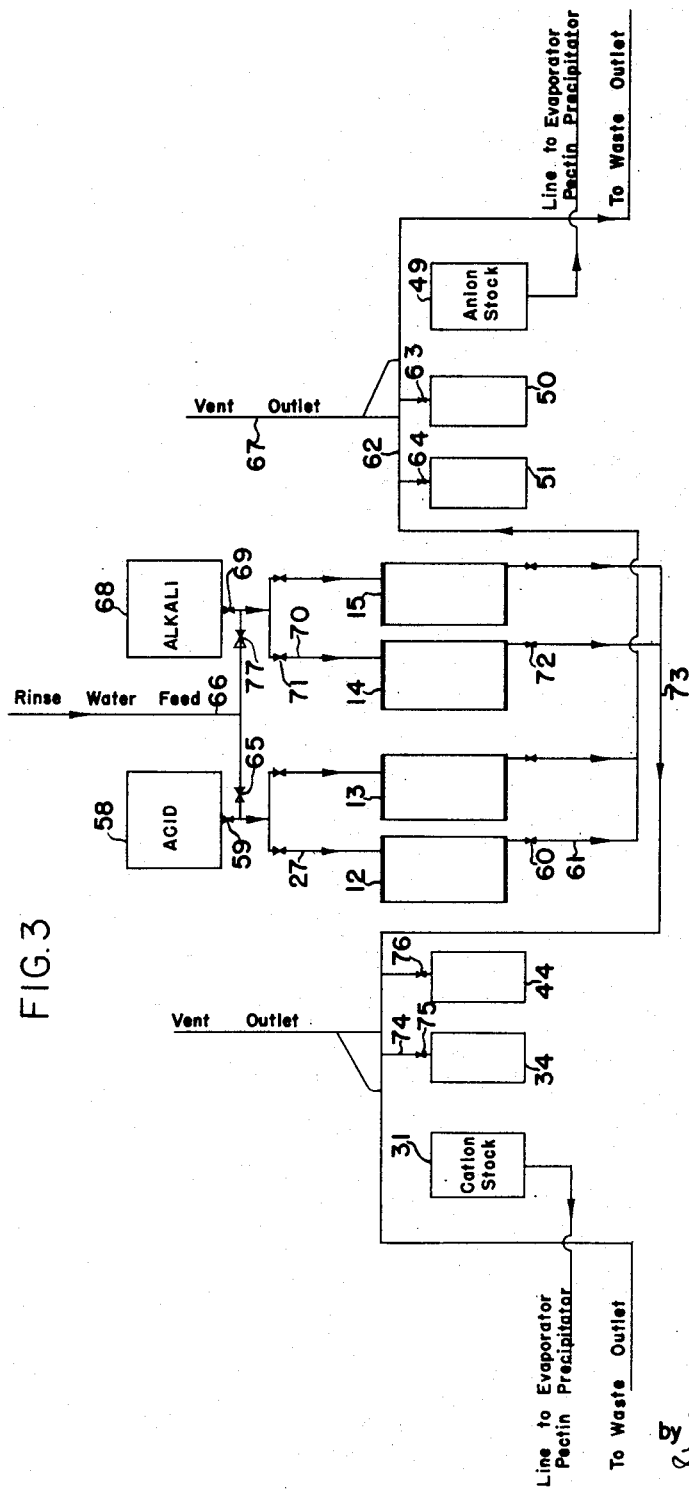

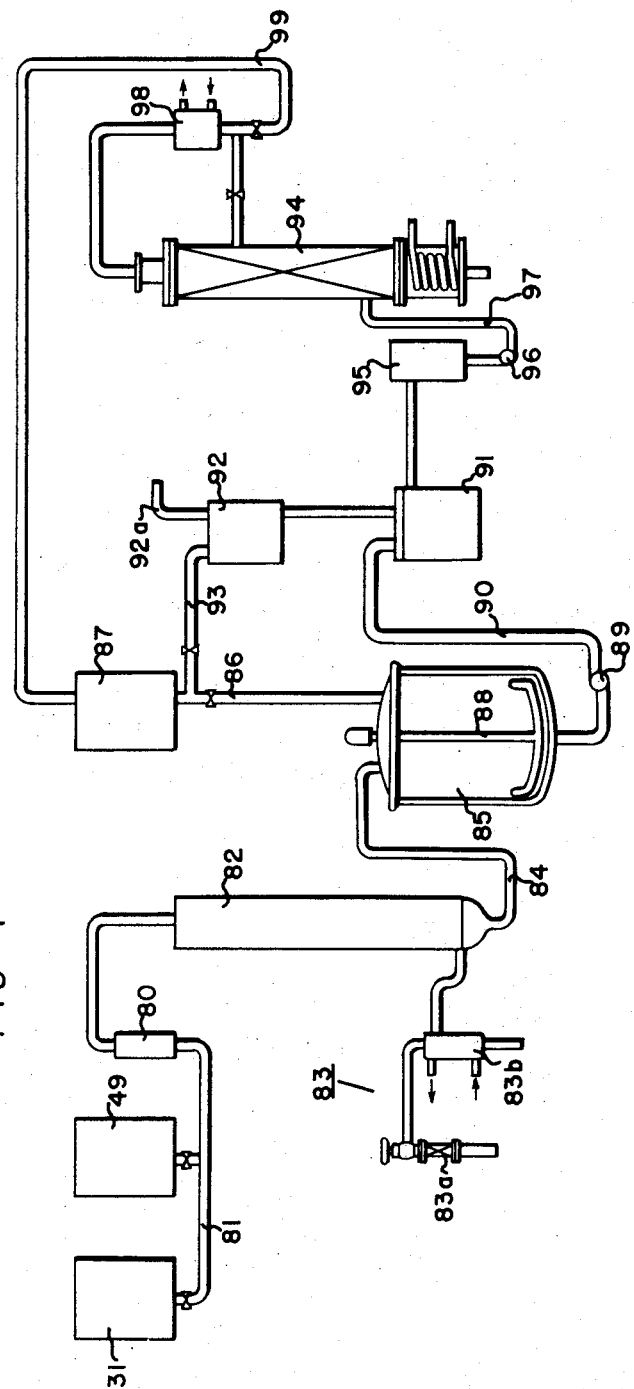

Patented Aug. 4, 1953

2,647,890

UNITED STATES PATENT OFFICE 2,647,890

PROCESS FOR THE EXTRACTION OF PECTIN FROM SUGAR BEET WATERS

Alfred E. Bishop, Dayton, Ohio, assignor to Superior Sugar Refining Company, Menominee, Mich., a corporation of Michigan Application January 20, 1950, Serial No. 139,734

6 Claims. (Cl. 260—209.5)

This invention relates to the recovery of pectin. More particularly it relates to a process of extracting pectin from sugar beets. Still more particularly, it relates to the recovery of pectin from sugar beet refinery waste water.

Pectin is a valuable by-product of sugar beet refining. In my co-pending application, Serial No. 104,695, filed July 14, 1949, entitled "Process for the Extraction of Pectin from Sugar Beet Pulp," there is disclosed a process for the recovery of pectin from beet pulp wherein the pectin is present in appreciable quantities.

So far as I know, no commercially feasible process has been developed for the recovery of pectin from waste water, such as wash water, wherein the concentration of pectin is very low.

It is an object of my invention to provide a continuous process that will permit continuous production of pectin from wash water and to produce it in large and economical quantities completely free from any contamination that would depreciate its value.

It is also an object to provide a succession of steps by which the pectin is separated from the waste water, the pectin is recovered as a solution of markedly higher concentration, the pectin is precipitated and finally removed by centrifuging or similar step, and thereafter is dried and is ground to provide a pectin powder that is stable to moisture, absorption and fermentation.

The particular object of the invention is to provide a pectin product that is free from impurities that heretofore made beet pectin not as desirable as fruit pectin.

This invention provides a new source of material from which pectin can be prepared.

It has been found that pectin can be efficiently recovered from sugar beet refinery waste waters by the following procedure:

The waste waters to be treated are contacted with ion exchange media for the purpose of removing the pectin therefrom. The pectin is then freed from the media and recovered as a solution of appreciable pectin concentration.

This more concentrated solution of pectin is adjusted to a pH within the range of approximately 3.5 to 4.0. The solution is then concentrated under controlled evaporation. This can be done under temperature and vacuum conditions in which the temperature is not allowed to exceed 190° F. and the vacuum is (gradually increased) maintained in the range of from 5 inches of mercury to 25 inches of mercury.

By adding 0.25 of an ounce of a wetting agent, such as octyl alcohol, ethylene glycol monophenyl ether or diethyl-tridecanol sulfate, to the aqueous filtrate prior to evaporation, the tendency of foaming during concentration is reduced. Concentration is carried on until the volume has been reduced to approximately 25 percent.

The concentrate is again adjusted to a pH value of 3.5 to 4.0 by use of a small amount of acid. This usually requires between 0.25 and .50 ounce of 12 percent hydrochloric acid per gallon of concentrate.

This concentrate, while at a temperature of 140° to 150° F., is diluted by adding to it one and a half to two (1.5 to 2.0) volumes of alcohol. The alcohol causes the pectin to separate from the aqueous solution as a flocculant, white precipitate which settles rapidly.

After standing for a period of one hour to permit complete precipitation, the pectin is removed by filtration. This may be done in various conventional methods; however, the use of the centrifuge is preferred for efficiency and ease of washing the pectin residue. The washing is done with fresh solvent that has been slightly acidified. This washing removes entrained impurities and assists in removing residual water.

Materials other than ethyl alcohol, such as methyl alcohol, propyl alcohol, acetone or methyl-ethyl ketone, may be used for precipitating pectin from the aqueous concentrate.

After filtration and washing, the pectin residue is dried at a temperature of 140° to 150° F., either under vacuum or with a current of air passing over it. The dry residue is then ground to a powder, screened to size and packaged. The powder may vary from a pale brown to a white color depending upon the care taken during the processing.

The initial step of abstracting the pectin from the wash water and the like is preferably carried out by flowing the water in sequence through beds of granular cation exchange material and of granular anion exchange material.

During passage of the water through the cation exchange bed, hydrogen is released in exchange for the cations of the dissolved salts and organic solutes. The water rendered acid by the presence of the hydrogen ion is then passed through an anion exchange bed which operates on the hydroxyl ion and thus de-acidifies the waste water.

The cation exchange materials used are synthetic resins of organic origin, such as those of the phenol-formaldehyde type. The anion exchange materials used are also synthetic resins of organic origin, such as those produced by the reaction between aromatic amines and formaldehydes. Such resins are substantially stable to the action of both acids and alkalies, and possess greater stability under such treatment than do the zeolites and sulfonated carbon type of exchange materials.

Recovery of the pectin from the exchange beds is effected by back washing the cation exchange bed with water, then treating the bed with spent alkaline regenerant and/or partially spent alkaline regenerant.

This is the most economical system, but alkaline solutions not utilized for regeneration can be used instead. By treating the cation bed with these alkali solutions, any ions, such as calcium, are exchanged for more soluble ions, such as sodium, prior to the subsequent acid regeneration.

Useful alkaline solutions for this purpose are sodium carbonate, sodium bicarbonate, sodium, potassium, lithium, ammonium hydroxides, and like materials.

At the same time the cation exchange bed of an individual series is given the auxiliary regeneration, the anion exchange bed is also given an auxiliary conditioning. This is preferably done by back-washing the anion exchange bed with water and then treating the bed with acid solution obtained from the previous regeneration of the cation exchange bed in a cycle which is counterpart to the cation bed regeneration.

Useful acid solutions for this purpose are sulfuric, hydrochloric, acetic, phosphoric, and the like.

The auxiliary regeneration treated tanks are next prepared to be put back in operation by treatment with a strong acid in the cation exchange bed and strong alkali in the anion exchange bed.

Upon completion of the regeneration cycle, the beds are thoroughly flushed with water to remove free acid or free alkali.

This process is designed to treat large volumes of waste water. Continuity of treatment is provided by arrangement of two or more parallel groups of cation and anion exchangers in series. In this way one or more groups of exchangers can be out of service for recovery of pectin and regeneration while another group is on stream.

The invention will be further understood by reference to the drawings in which:

Figure 3 is a diagrammatic illustration of the auxiliary regeneration system wherein the pectin is recovered and outlining the fluid flow; and Figure 4 is a diagrammatic illustration of a complete pectin recovery system.

ION EXCHANGE

Figure 1:
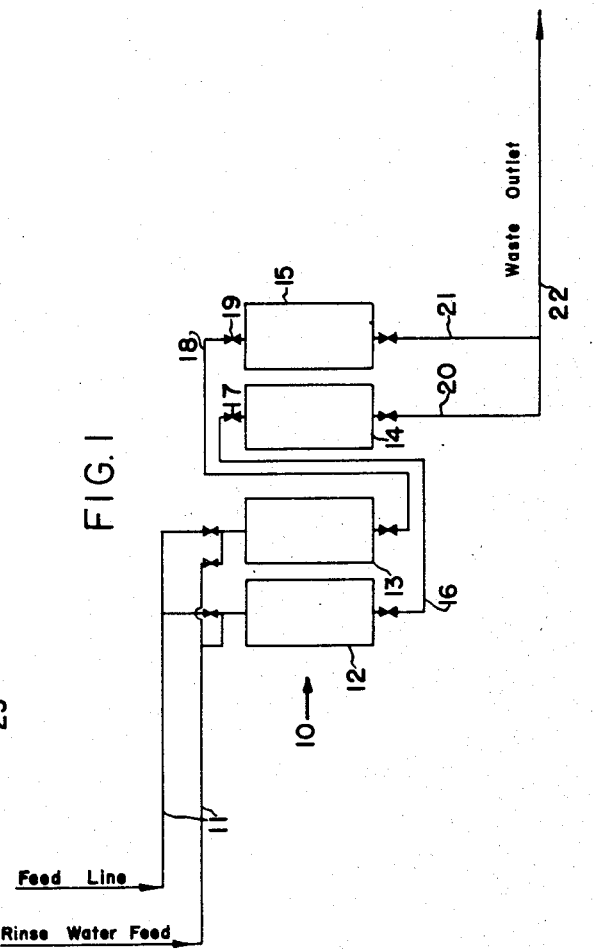
Figure 1 is a diagrammatic illustration of exchangers and material flow.

Referring to the drawings in detail, the rinse water feed is delivered to the exchanger system 10 through a suitably valved interconnected pipe line system 11.

Exchanger system 10, as illustrated, consists of tanks 12 and 13, each charged with cation exchange material, and tanks 14 and 15, each charged with anion exchange material.

Tank 12 is connected to tank 14 through conduit 16 in which conduit the flow is restricted by suitable valve means 17. Tank 13 is similarly connected with tank 15 through line 18 equipped with valve means 19.

Parallel outlet pipes 20 and 21 connect tanks 14 and 15 to a waste outlet header 22.

In operation, the feed is directed to one or the other of the tanks 12 and 13. If to tank 12, the feed percolates downward through the granular bed of phenol-formaldehyde resin and flows to tank 14 through line 16.

In tank 14, the liquid percolates downward through the granular bed of phenyl amine-formaldehyde resin and flows to waste through lines 20 and 22. This effluent liquid will be substantially free of pectin and ionizable salts and will be a relatively neutral liquid.

The effective operation period or active life of this series of exchange units is measured by maintaining a pH control reading of the solution as it leaves the respective ion exchange beds. When the exchange capacity has become exhausted, the flow of solution through the feed line 11 is diverted from tank 12 to tanks 13 and 15.

The latter series, having been regenerated during the interval the tanks 12 and 14 were in operation, tanks 12 and 14 may then be given the auxiliary regeneration or displacement of the adsorbed material.

Figure 2:
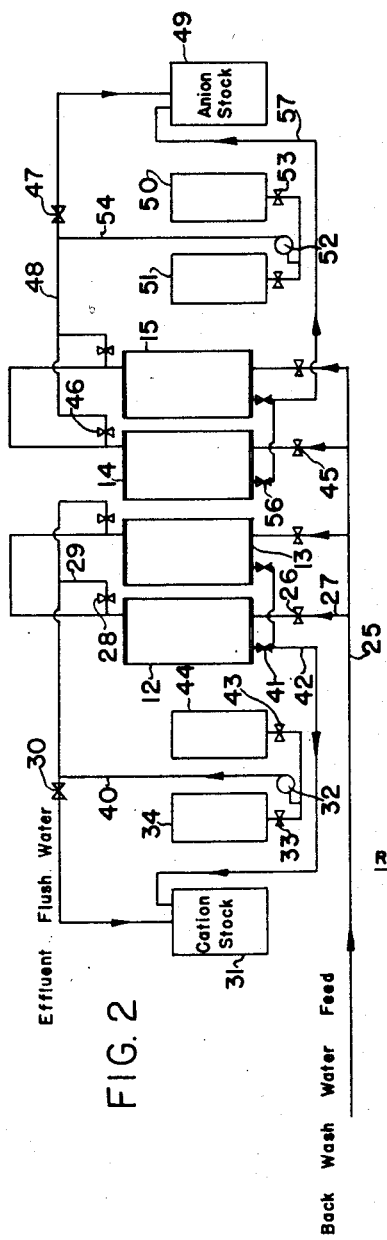
Figure 2 is a diagrammatic illustration of the back washing equipment arrangement and liquid flow.

Figure 2 shows the flow diagram for the second cycle of operation. In this figure, the exchange beds in tanks 12 and 14 are treated independently. Bed 12 is back washed with water from line 25 by opening valve 26 in line 27 and then passing upward through the tank 12, discharging through valve 28 and line 29 with valve 30 open into the cation stock storage tank 31. The upward flow of water in tank 12 lifts or agitates the granular cation exchange resin and removes adhering non-ionizable organic materials.

Valves 26 and 30 may then be closed and pump 32 started. By opening valve 33 at the bottom of tank 34, the first fraction of spent alkaline regenerant solution, obtained from the previous anion exchange regeneration, may be pumped through lines 40 and 29, and with the valve 28 open is directed in a downward direction through the exchange resin bed in tank 12.

The solution is discharged at the bottom of this tank through an open valve 41 and through line 42 to the cation stock storage tank 31. After exhausting the solution in tank 34, valve 33 is closed and valve 43 is opened, allowing the second fraction of alkaline solution to be drawn from tank 44. This liquid is passed in the same manner through the resin bed in tank 12 and delivered to the cation stock storage. Pump 32 may then be shut off and the valves 43, 28 and 41 closed.

At the same time the exchange bed in tank 12 is given the auxiliary regeneration, the anion exchange bed in tank 14 is also given an auxiliary conditioning. This is done by first back-washing with water from line 25 directed to the bottom of tank 14 by opening valve 45. As the water rises, the granular anion exchange resin is agitated and organic materials flushed away.

With valves 46 and 47 open, this water is exhausted through line 48 and collected in the anion stock storage tank 49.

The anion solution obtained from the previous regeneration of the cation exchange bed and currently stored in tanks 50 and 51 is next used for conditioning the anion exchange bed in the identical procedure utilized for the auxiliary regeneration of the cation exchange bed.

This regeneration involves a pump 52, valve 53, and lines 54 and 55. The solution is discharged at the bottom of the tank by opening the valve 56 and carried through line 57 to the anion stock storage tank. After emptying tank 50 the solution in tank 51 is similarly flowed through the system to the anion storage tank 49.

The ion exchange beds in exchangers 12 and 14 are now ready for the final regeneration treatment as shown by the flow diagram in Figure 3. In this operation, the two exchange beds are treated separately but simultaneously.

In the regeneration of the exchange bed 12 a strong acid is flowed from the overhead storage tank 58 and fed by gravity by opening valve 59. The acid is carried by line 27 to the top of tank 12. It then passes downward through the cation bed where the hydrogen of the acid is adsorbed by the resin in exchange for the sodium or other cation elements that are present from the auxiliary treatment.

The exhausted or weak acid is then discharged through the open valve 60 and through pipes 61 and 62 with the valve 63 being open and delivered to the tank 50.

When the strength of the discharged acid indicates that the exchange material in tank 12 is properly satisfied with hydrogen ions, valve 59 is closed to the acid supply tank. Valve 63 is also closed and valve 64 is opened, permitting the less depleted acid to enter tank 51.

The exchange bed in tank 12 is then flushed with water to remove the free or unused acid. This is accomplished by opening valve 65 in the rinse water feed line 66 and allowing the water to follow the same course as used for the acid.

The free acid flushed from the system is collected in tank 51.

A vent outlet line 67 is provided to relieve any excessive back pressures and also provides a safety by-pass of solution to the waste outlet.

In the regeneration of the bed in tank 14, a strong alkali stored in an overhead tank 68 is fed to the system by gravity by opening valve 69. The alkali is carried by line 70, with valve 71 being open, to the top of tank 14. The alkali then passes downward through the anion bed.

The exhausted or weak alkali then discharges through the open valve 72 and through pipes 73 and 74, and with valve 75 opened is delivered to tank 34. When the strength of the discharged alkali indicates that the exchange material in tank 14 is satisfactory, valve 69 is closed. Valve 75 is also closed and valve 76 opened permitting the less depleted alkali to enter tank 44.

The anion exchange bed in tank 14 is then flushed with water to remove the unused alkali. This is accomplished by opening valve 77 in water line 66 and allowing the water to follow the same course as used for the alkali. The vent outlet line 78 is provided to relieve any excessive back pressures and also provides a safety by-pass for solutions to the waste outlet.

The exchange materials in tanks 12 and 14, which function as a unit, are now fully regenerated and ready to be placed back in operation.

The pectin thus collected is now held in the cation and anion stock storage tanks. The contents of these two tanks are combined and delivered to an evaporator. There, after final concentration, precipitation, separation and drying operations are performed in accordance with the following procedure.

EVAPORATION

Cation stock accumulated in tank 31 is led to a preheater 80 through line 81. From preheater 80 the liquid is fed to an evaporator 82. A vacuum is induced by suitable means 83 such as a steam jet 83a and condenser 83b. Evaporator 82 may consist of a vacuum pan or a tubular evaporator of one or more effects. Concentrated liquid is transferred from evaporator 82 to a precipitating tank 85 through line 84.

PRECIPITATION

In tank 85, alcohol is added to cause the pectin to separate from its aqueous concentrate in the form of a white flocculant precipitate. Alcohol is led to the precipitator through line 86 from storage tank 87. Upon addition of alcohol the mixture is agitated by a stirrer 88 and then allowed to stand to permit complete precipitation.

SEPARATION

It will be observed that the final separation is by use of a centrifuge. Precipitate and solution are moved by means of pump 89 through line 90 to centrifuge 91. In centrifuge 91, the separated solids are washed with alcohol that has been slightly acidified. This acidified alcohol is prepared in tank 92. Alcohol is transferred to tank 92 from storage tank 87 through line 93. Acid is fed to tank 92 through line 92a from a source not shown.

The aqueous alcohol solution issuing from the centrifuge 91 is fractionated to recover alcohol for recirculation in the system. The dilute alcohol is transferred to a 20 plate alcohol fractionating column 94 from an accumulator tank 95 by means of pump 96 and line 97. Refluxing is accomplished by returning a portion of the condensate from condenser 98 to column 94. The balance of the concentrated alcohol solution 90% or higher percentage alcohol content is transferred to storage tank 87 through conduit 99.

DRYING AND GRADING

Upon completion of the foregoing steps the pectin residue is dried by heating to 140°–150° F., ground and screened to size, and then packaged. The pectin powder thus prepared is stable to moisture, absorption and fermentation.

The following is an example of a detailed procedure which may be followed for pectin recovery in accordance with the instant invention:

*Example*

500 lbs. of phenol-formaldehyde resin may be placed in each cation exchange tank;

100 lbs of phenyl amine-formaldehyde resin may be placed in each of the anion exchangers;

5,000 gallons of rinse water per hour having an average pectin content of .02% by weight of the solution are percolated through the ion exchange system;

Approximately 98% of the available pectin is abstracted by the resin material;

Tank 12, after backwashing with about 100 gallons of water and treating with approximately 300 gallons of spent alkali solution, is free of pectin and ready for regeneration;

A corresponding backwashing of tank 14 with water and spent acid solution frees the anion bed of foreign material;

The pectin is thus collected in solutions in the anion and cation stock storage. The content of these tanks is combined giving a solution of between 2% and 3% by weight of pectin for evaporations;

The pectin is next transferred to an evaporator where the volume is reduced by removing 75 to 80% of the water. This is best done in a vacuum type evaporator where the water can be removed at temperatures not exceeding 190° F. To prevent foaming it is necessary to slowly increase the degree of vacuum during this operation. When the volume has been reduced to approximately ¼ of the initial volume, the evaporation is stopped and the concentrate is transferred to the precipitating tank.

The concentrate, while at a temperature of 140 to 150° F., is diluted by adding to it 1¼ to 1½ gallons of alcohol to gallon of concentrate. The alcohol causes the pectin to separate from its aqueous solution in the form of a flocculant white precipitate, which settles fairly rapidly. Upon addition to the alcohol the mixture is thoroughly agitated and then allowed to stand for a period of an hour to permit complete precipitation.

By this process, pectin is recovered which was formerly entirely lost to commerce. The recovered pectin solution obtained from the ion exchangers is a solution 100% more concentrated than the original solution and is thus processable independently or in combination with pectin recovered from other sources.

It will be understood that while there has been given herein a certain specific example of the practice of this invention, it is not intended thereby to have this invention limited to or circumscribed by the specific detail of materials, proportions, or conditions herein specified, in view of the fact that this invention may be modified according to individual preference or conditions without necessarily departing from the spirit of this disclosure and the scope of the appended claims.

I claim:

1. In a method of recovering pectin from beet refinery waste water, the steps comprising passing the sugar processing wash water through beds of cation and anion exchange resins in series, said cation exchange bed comprising phenol-formaldehyde resin and said anion exchange bed comprising phenyl amine-formaldehyde resin, dissolving the pectin from said series of beds by back-washing the resins with water and then washing the cation resins with used alkali and the anion resins with used acid from regeneration of the anion and cation resins, respectively, separating the pectin solution from the resin, concentrating the pectin solution, precipitating the pectin by the addition of alcohol, and separating the water-alcohol solution from the pectin.

2. In a method of recovering pectin from beet refinery waste water, the steps comprising passing the sugar processing wash water through beds comprising a cation exchange bed of phenol-formaldehyde resin and an anion exchange bed of phenyl-formaldehyde resin in series, dissolving the pectin from the exhausted cation exchange group by back-washing with water and then washing with used alkali and the anion exchange group by back-washing with water and then washing with used acid, regenerating the washed cation resin with new acid and recovering the acid for wash use and regenerating the anion resin with alkali and recovering the alkali for wash use, successively and repetitively regenerating the alternate groups, collecting the back washings from both the cation and anion exchanges and precipitating the pectin with alcohol, and separating the water-alcohol solution from the pectin.

3. In a method of recovering pectin from beet refinery waste water, the steps comprising passing the sugar processing wash water through beds comprising a cation exchange bed of phenol-formaldehyde resin and an aromatic amine-formaldehyde resin anion exchange bed in series, dissolving the pectin from the exhausted phenol-formaldehyde exchange group by back-washing with water and then washing with used alkali, and the aromatic amine-formaldehye exchange group by back-washing with water and then washing with used acid, regenerating the washed phenol-formaldehyde resin with new acid and recovering the acid for wash use and regenerating the aromatic amine-formaldehyde resin with alkali and recovering the alkali for wash use, successively and repetitively regenerating the alternate groups, collecting the back washings from both the cation and anion exchanges and precipitating the pectin with alcohol, and separating the water-alcohol solution from the pectin.

4. In a method of recovering pectin from beet refinery waste water, the steps comprising passing the sugar processing wash water through beds comprising a cation exchange bed of phenol-formaldehyde resin and phenyl amine-formaldehyde resin anion exchange bed in series, dissolving the pectin from the exhausted phenol-formaldehyde exchange group by back-washing with water and then washing with used alkali, and the phenyl amine-formaldehyde exchange group by back-washing with water and then washing with used acid, regenerating the washed phenol-formaldehyde resin with new acid and recovering the acid for wash use and regenerating the phenyl amine-formaldehyde resin with alkali and recovering the alkali for wash use, successively and repetitively regenerating the alternate groups, collecting the back washings from both the cation and anion exchanges and precipitating the pectin with alcohol, and separating the water-alcohol solution from the pectin.

5. In a method of recovering pectin from beet refinery waste water, the steps comprising passing the sugar processing wash water through a bed of phenol-formaldehyde resin for effecting cation exchange and a bed of aromatic amine-formaldehyde resin anion exchange in series, dissolving the pectin by back-washing the resins with water and then washing the phenol-formaldehyde resins with used alkali and the aromatic amine-formaldehyde resins with used acid from regeneration of the phenol-formaldehyde and aromatic amine-formaldehyde resins, respectively, separating the pectin solution from the resin, concentrating the pectin solution, precipitating the pectin with alcohol, and separating the water-alcohol solution from the pectin.

6. In the method of recovering pectin from beet sugar refinery waste water containing pectin by ion exchange treatment, the improvement which comprises the steps of (a) flowing the waste refinery water through a bed containing granular cation exchange phenol formaldehyde resin particles, (b) flowing the effluent from said cation exchange bed through a bed containing aromatic amine-formaldehyde resin particles for effecting an anion exchange, (c) washing said cation exchange bed and said anion exchange bed to recover a solution containing pectin, (d) precipitating the pectin from the combined washing solutions by the addition of alcohol thereto, and (e) separating the precipitated pectin from said combined solution.

ALFRED E. BISHOP.

References Cited in the file of this patent

UNITED STATES PATENTS

| Number | Name | Date |
|---|---|---|
| 833,114 | Becigneul | Oct. 9, 1906 |
| 2,323,483 | Myers et al. | July 6, 1943 |
| 2,344,929 | Bardwell | Mar. 21, 1944 |
| 2,413,791 | Shafor | Jan. 7, 1947 |
| 2,413,844 | Rawlings | Jan. 7, 1947 |
| 2,503,767 | Rawlings | Apr. 11, 1950 |

OTHER REFERENCES

Buck et al., Ind. Eng. Chem., vol. 37 (1945), pages 635–638.